(12) United States Patent
Mackenzie et al.

(10) Patent No.: US 9,493,279 B2
(45) Date of Patent: *Nov. 15, 2016

(54) PORTABLE BEVERAGE CONTAINER WITH SELF OPENING HINGED LID

(71) Applicant: Tervis Tumbler Company, North Venice, FL (US)

(72) Inventors: David K. Mackenzie, Cincinnati, OH (US); Thomas Remm, Milford, OH (US); Bryan Keller, Springboro, OH (US)

(73) Assignee: Tervis Tumbler Company, North Venice, FL (US)

( * ) Notice: Subject to any disclaimer, the term of this patent is extended or adjusted under 35 U.S.C. 154(b) by 21 days.

This patent is subject to a terminal disclaimer.

(21) Appl. No.: 14/691,889

(22) Filed: Apr. 21, 2015

(65) Prior Publication Data

US 2015/0225141 A1    Aug. 13, 2015

Related U.S. Application Data

(63) Continuation of application No. 13/733,422, filed on Jan. 3, 2013, now Pat. No. 9,022,239.

(60) Provisional application No. 61/583,667, filed on Jan. 6, 2012.

(51) Int. Cl.
| | | |
|---|---|---|
| *B65D 43/16* | (2006.01) | |
| *B65D 47/08* | (2006.01) | |
| *B65D 51/00* | (2006.01) | |
| *F16F 1/36* | (2006.01) | |
| *F16F 1/373* | (2006.01) | |

(52) U.S. Cl.
CPC ........... *B65D 47/0871* (2013.01); *B65D 43/16* (2013.01); *B65D 51/00* (2013.01); *F16F 1/36* (2013.01); *F16F 1/373* (2013.01); *B65D 2251/0021* (2013.01); *B65D 2251/105* (2013.01)

(58) Field of Classification Search
CPC .. B65D 47/0871; B65D 43/16; B65D 51/00; B65D 2251/0021; B65D 2251/105; B65D 2251/0018; B65D 2251/10; B65D 47/0828; F16F 1/373; F16F 1/36
USPC ............. 220/254.5, 264, 827, 829, 833–835; 215/235, 237

See application file for complete search history.

(56) References Cited

U.S. PATENT DOCUMENTS

| | | |
|---|---|---|
| 4,454,889 A | 6/1984 | Contreras |
| 5,246,145 A | 9/1993 | Leoncavallo et al. |
| 5,344,037 A | 9/1994 | Favre |
| 5,392,938 A | 2/1995 | Dubach |
| 5,620,107 A | 4/1997 | Takeuchi |
| 5,762,216 A | 6/1998 | Takeuchi |
| 5,868,265 A | 2/1999 | Kobayashi |
| 7,270,244 B1 | 9/2007 | Liu |
| 2003/0136783 A1 | 7/2003 | Hatsumoto et al. |
| 2005/0218105 A1 | 10/2005 | Arai |

*Primary Examiner* — James N Smalley
(74) *Attorney, Agent, or Firm* — Caesar Rivise, PC

(57) ABSTRACT

A portable beverage container (e.g., an insulated, double-walled bottle) is disclosed. The container includes a lid pivotably connected to it by a hinge. The lid is arranged to be automatically pivoted open by the spring assembly when a catch on the lid is released so that the lid opens in a controlled, non-jarring manner. The spring assembly comprises an elastomeric member and a contact surface (e.g., a recess in a cap of the bottle). The elastomeric member is arranged to cooperate with the contact surface whereupon the elastomeric member operates bi-modally to effect the automatic opening of the lid.

19 Claims, 4 Drawing Sheets

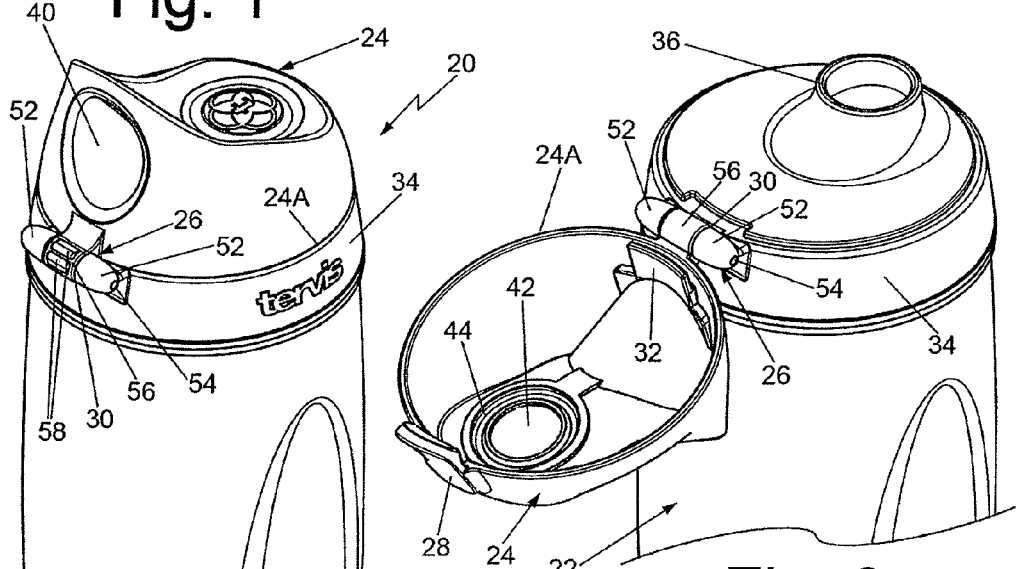
Fig. 1
Fig. 2
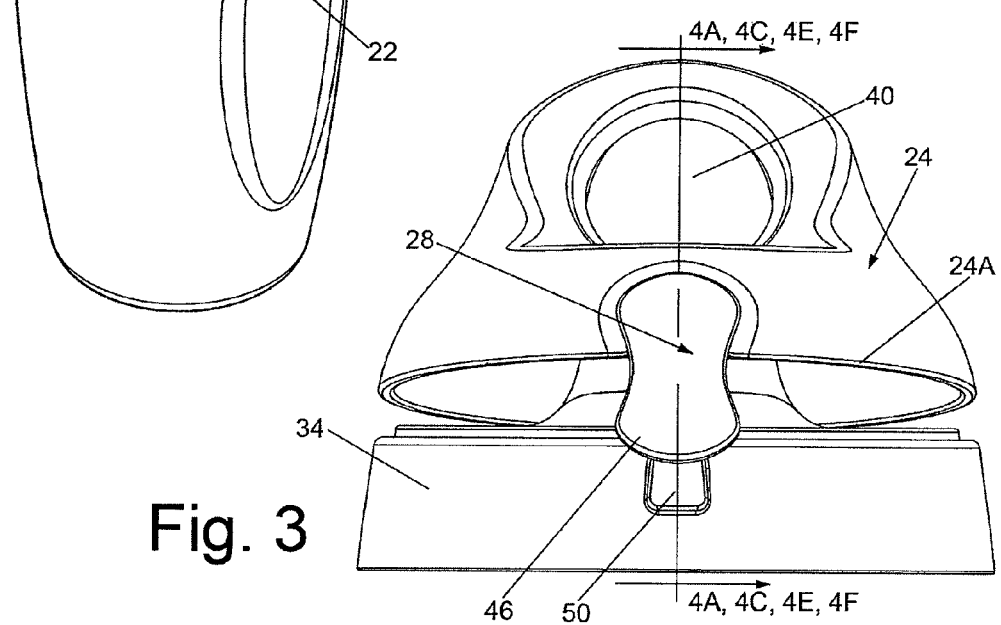
Fig. 3

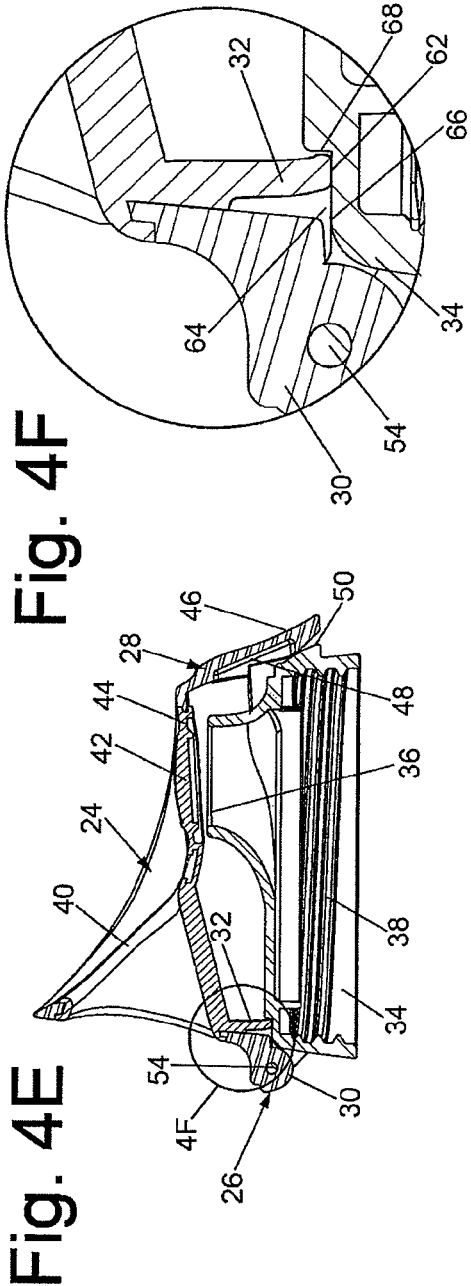
Fig. 4E
Fig. 4F
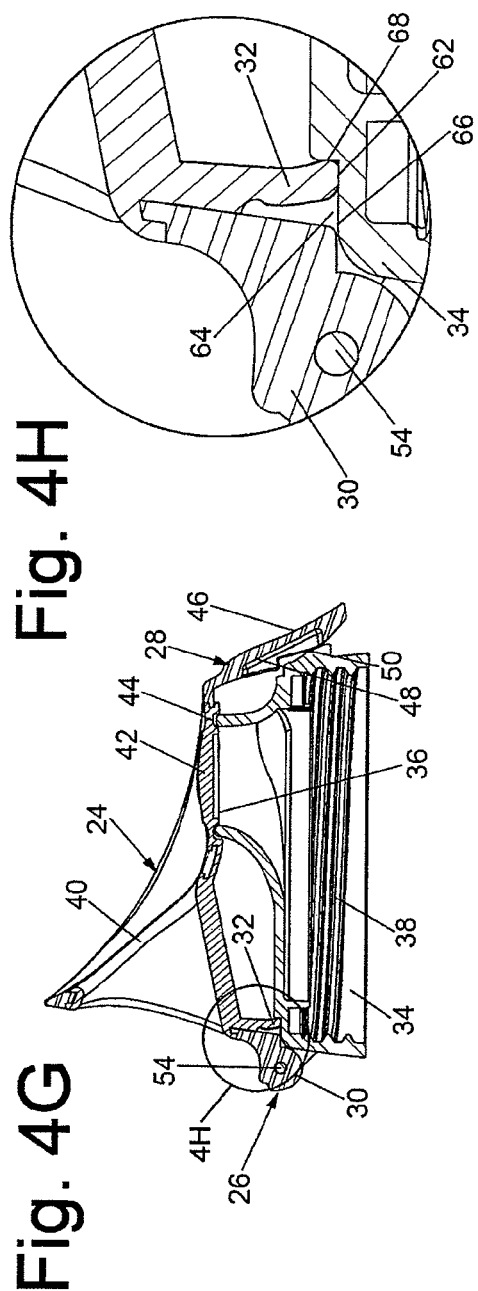
Fig. 4G
Fig. 4H

PORTABLE BEVERAGE CONTAINER WITH SELF OPENING HINGED LID

CROSS-REFERENCE TO RELATED APPLICATIONS

This continuation application claims the benefit under 35 U.S.C. §120 of application Ser. No. 13/733,422, filed on Jan. 3, 2013 and entitled "Portable Beverage Container with Self Opening Hinged Lid", which claims the benefit of Provisional Application No. 61/583,667 filed Jan. 6, 2012 and entitled "Portable Beverage Container with Self Opening Hinged Lid" under 35 U.S.C. §119(e), and the entire contents of each of these applications are expressly incorporated herein by reference thereto.

FIELD OF THE INVENTION

This invention relates generally to containers and particularly to containers, such as drink bottles, having self-opening hinged lids.

BACKGROUND OF THE INVENTION

Heretofore bottles and other portable containers for holding drinks have been provided with lids that are arranged to be opened to enable the user to have access to the contents of the bottle. Some of these prior art products have made use of self-opening lids, e.g., a lid which springs open when the lid is unlatched or actuated from its closed state. The means for opening such prior art lids have typically comprised either coil torsion springs, coil compression springs or elastomeric compression springs, which are arranged to operate to swing the lid from a closed state to an open state when the lid is unlatch or actuated. While each of those springs is generally suitable for effecting the opening of a lid for a bottle, vessel or other container, they never the less suffer from one or more disadvantages.

For example, insofar as coil torsion springs are concerned, they are typically unsanitary, since the coils can trap contaminants. In addition, they are difficult to assemble due to the fact that they are composed of multiple components. Further still, those coil torsion springs which can be made small enough to fit in the required size of bottle or container, have a tendency to fail due to fatigue.

Coil compression springs also suffer from the fact that they are not particularly sanitary due to the potential to trap contaminants in their coils. Moreover coil compression springs are also typically inserted into a pocket in the bottle or container, thereby resulting in another area that may trap contaminants. Like coil torsion springs, coil compression springs are difficult to assembly due to their multiple components. Lastly coil compression having a controlled variable spring rate are expensive.

Elastomeric compression springs also suffer from the disadvantage of not being sanitary. In this regard, such springs, like coil compression springs, are typically mounted or inserted into a pocket, which can serve as a trap for contamination. Moreover, the spring's pocket also traps air that can push spring out. If the assembly is vented to prevent the trapping of air, such an arrangement increases contamination hazard because the vent allows for flow between the pocket and container, but not enough to properly clean. Moreover, elastomeric compression springs, if biased so that they will not over-compress may not be able to store enough energy to open the lid, when required. In this regard, in order to store enough energy to effectively open the lid, the spring needs to have a high spring rate, thus rendering it susceptible to compression set, or it may be too long to fit in the available confined space within the lid. Lastly, the tolerances in the manufacture of elastomeric compression springs make it difficult, if not impossible, to control a force high enough to open the lid, but not so high as to produce an abrupt or jarring effect when the lid reaches the end of its swing.

Accordingly, a need exists for a self-opening lid for a bottle or for any other container having an interior which is to be closed off by the lid, and which overcomes the disadvantages of the prior art.

The subject invention addresses those needs by providing a self-opening hinged lid exhibiting a pleasing tactile experience, and which does not add exorbitant cost to the product in which it is located.

SUMMARY OF THE INVENTION

In accordance with one aspect of this invention a portable container, is provided for holding a liquid therein. The container basically comprises a hollow vessel (e.g., an insulated, double-walled bottle), a lid pivotably connected to the vessel by a hinge and a spring assembly. The lid is coupled to the spring assembly to selectively close off or expose the interior of the vessel. The spring assembly is arranged to automatically cause the lid to be pivoted from a fully closed state to an opened state upon the release of a catch. The spring assembly comprises an elastomeric member and a contact surface. The contact surface (e.g., a recess) is located at a member (e.g., a cap with a spout) coupled to the container. The elastomeric member is arranged to cooperate with the contact surface, whereupon the elastomeric member operates bi-modally. In particular, in accordance with one exemplary preferred embodiment of the invention the elastomeric member of the spring assembly operates as a reed and compression spring when the lid is in the fully closed state and operates as a reed spring after the lid has begun opening to carry it to its opened state. When the lid is in the fully closed state the elastomeric member pushes against the contact surface to cause the elastomeric member to flex and be in compression to store energy therein. When the catch is released, the energy stored in the elastomeric member is released, whereupon the elastomeric member pushes off of the contact surface to automatically cause the lid to pivot from its fully closed state toward its opened state, with the elastomeric member transitioning from the flexed and compressed state to an unflexed state when the lid is in the opened position.

In accordance with another aspect of the invention there is provided a spring assembly for use in a product having a hollow body and a lid pivotably connected to the body by a hinge. The lid is arranged to selectively close off or expose the interior of the body. To that end the spring assembly is arranged to automatically cause the lid to be pivoted from a fully closed state to an opened state upon the release of a catch. The spring assembly comprises an elastomeric member and a contact surface. The elastomeric member is arranged to cooperate with the contact surface so that the elastomeric member operates bi-modally.

DESCRIPTION OF THE DRAWING

FIG. 1 is an isometric view of an exemplary insulated bottle having a self-opening hinged lid constructed in accordance with the teaching of this invention;

FIG. 2 is an isometric view of a portion of the embodiment of FIG. 1, with the hinged lid shown in its opened position;

FIG. 3 is a front elevation view of the lid portion of the embodiment of FIG. 1 shown in an initially opened position, i.e., just after when a latch holding the lid in place in its closed condition has been released, whereupon a spring of the hinge assembly has begun pivoting the lid upward;

FIGS. 4A-4J are vertical sectional views of the lid only, with the spring of its hinge assembly being shown at various stages of spring compression. In particular, FIG. 4A is a vertical sectional view taken along line 4A of FIG. 3 showing the lid at the stage at which the elastomeric spring element is about to make contact with a portion of a cap of the bottle;

FIG. 4B is an enlarged sectional view of the spring portion of the hinge assembly shown within the area bounded by the circled designated as 4B in FIG. 4A;

FIG. 4C is a vertical sectional view taken along line 4C of FIG. 3 showing the lid at the stage at which the elastomeric spring element initially makes contact with a portion of a cap of the bottle;

FIG. 4D is an enlarged sectional view of the spring portion of the hinge assembly shown within the area bounded by the circled designated as 4D in FIG. 4C;

FIG. 4E is a vertical sectional view taken along line 4E of FIG. 3 showing the lid at the stage at which the elastomeric spring element is primarily bending as a reed spring;

FIG. 4F is an enlarged sectional view of the spring portion of the hinge assembly shown within the area bounded by the circled designated as 4F in FIG. 4E;

FIG. 4G is a vertical sectional view taken along line 4G of FIG. 3 showing the lid at the stage at which the elastomeric spring element is transitioning from bending to compressing, thereby increasing the spring rate;

FIG. 4H is an enlarged sectional view of the spring portion of the hinge assembly shown within the area bounded by the circled designated as 4H in FIG. 4G;

FIG. 4I is a vertical sectional view taken along line 4I of FIG. 3 showing the lid when it is closed and latched and the spring is compressed at its highest spring rate; and FIG. 4J is an enlarged sectional view of the spring portion of the hinge assembly shown within the area bounded by the circled designated as 4J in FIG. 4G;

DETAILED DESCRIPTION OF THE PREFERRED EMBODIMENT

Figure 4A:
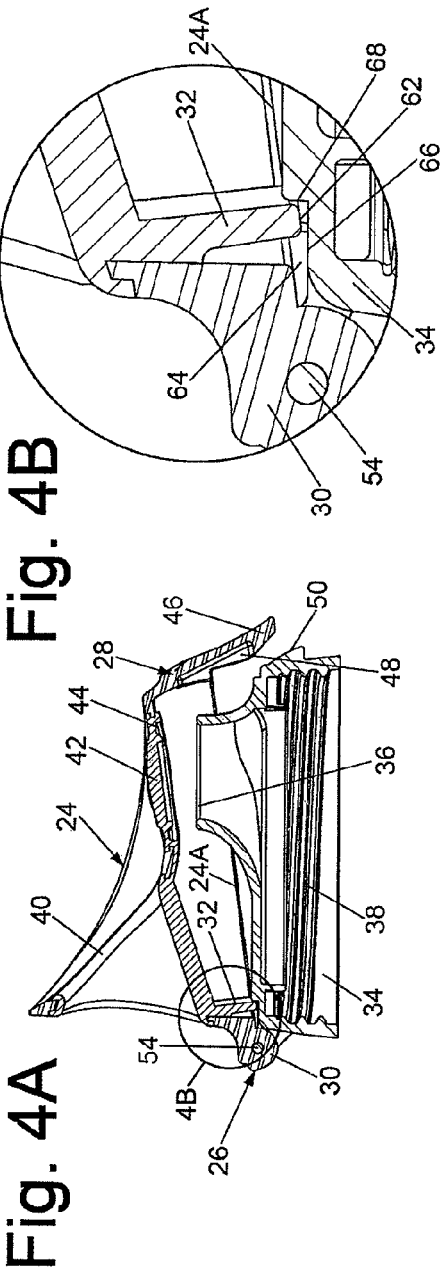

Referring now to the various figures of the drawing wherein like reference characters refer to like parts, there is shown at 20 in FIG. 1 one exemplary embodiment of an insulated bottle including a self-opening lid which is constructed in accordance with this invention. It must be pointed out at this juncture that the bottle 20 is merely illustrative of numerous products, be they containers or other products that can make use of a self-opening lid constructed in accordance with this invention.

The bottle is best seen in FIGS. 1-3 and basically comprises a double walled vessel made up of an assembly of a hollow outer body or vessel 22, a hollow inner liner or vessel (not shown). The double walled vessel includes a lid 24, a hinge assembly 26 and a latch or catch 28. The outer vessel 22 is a hollow member which is blow molded of a thermoplastic material. The hollow inner vessel is also blow molded of a thermoplastic material (e.g., the same plastic material as the vessel 22 or some other material). The inner vessel is disposed within and ultrasonically welded to the outer vessel 22, so they are separated from each other by an air-gap or space. With this arrangement the inner vessel of the bottle assembly is thermally insulated from the ambient atmosphere. The vessel is arranged to receive any type of liquid, e.g., cold water or soda, hot tea or coffee, etc., to maintain its temperature. The vessel may be constructed in accordance with the teaching of co-pending U.S. Provisional Patent Application Ser. No. 61/567,234, filed on Dec. 6, 2011, entitled Portable Beverage Container With Ultrasonic Welded Joint And Method Of Making The Same, which is assigned to the same assignee as this invention and whose disclosure is specifically incorporated by reference herein. However it must be pointed out that the vessel may take alternative constructions. Thus, it need not be a double-walled insulated bottle. In fact, the container may not even be a bottle. In this regard, the subject invention contemplates a self-opening lid adapted for use on any container or member and which is arranged to automatically open, e.g., pivot from a closed state to an opened state, when actuated, e.g., when an associated catch or latch is released.

As best seen in FIGS. 2-3 and 4A the lid 24 is a generally hollow member formed of any suitable material, e.g., polypropylene, and having a peripheral edge 24A. The lid is connected to a cap of the double walled vessel by the hinge assembly 26 so that it can be pivoted upward from its closed position, shown in FIG. 1, to its open position shown in FIG. 2, to provide access to the contents of the vessel. The hinge assembly 26 basically comprises a hinge 30 and a spring member 32. The hinge 30 is mounted on a cap 34. The cap 34 is also formed of any suitable material, e.g., polypropylene, and is releasably secured to the top of the double walled vessel to close off the interior of the vessel to contain the contents within the vessel. The cap includes a spout 36 which is in fluid communication with the interior of the vessel so that the user can have access to the liquid contents through the spout 36, when the 24 lid is in its open position. While the cap is shown as releasably secured, by threads 38 (FIG. 4A), to the top of the double walled vessel, other types of releasable securement can be used.

As best seen in FIGS. 1 and 3 the lid 24 includes a tubular passageway 40 extending through an upper portion of it. The passageway 40 serves as a means to receive a cord, carabiner or some other member (not shown) to suspend the bottle 20 so that it can be readily carried by the user.

As best seen in FIGS. 2 and 4A the central portion of the lid 24 includes a diaphragm portion 42, having an annular recess 44, which is shaped and arranged to engage the periphery of the spout 36 to seal the spout when the lid is closed and latched. By so doing the contents of the vessel cannot gain egress through the spout to the inside of the lid when the lid is closed and latched. In accordance with one preferred embodiment of this invention the portions 32, 40, 42 and 44 are all one continuous over-molded member which is formed of an elastomeric material e.g., thermoplastic elastomers (TPE) (sometimes also referred to as thermoplastic rubbers) or other copolymers or a physical mix of polymers with both thermoplastic and elastomeric properties.

Turning now to FIGS. 3 and 4A, the details of the catch 28 will now be described. The catch 28 basically comprises a tab 46 formed of the same polymer material, e.g., polypropylene, as the cap 24 (in fact it is merely an extension of the cap), but due to its shape can be flexed or bent somewhat. The tab has a recess 48 in its undersurface which is arranged to snap fit and receive a cammed projection 50 which extends outward from the periphery of the cap member 34 when the tab is flexed. The projection 50 is located on the cap member at a position diametrically opposite the location of the hinge 30. The catch 28 is arranged to hold the lid 24 in its closed position against the urging of the spring member 32, when the catch is in its closed condition. To release the catch all one has to do is to lift the free end of the tab 46 to flex it outward from the periphery of the cap member, thereby freeing the cammed projection 50 from the recess 48 in the tab. Upon release of the catch the elastomeric spring 32 causes the lid to pivot open to the opened position shown in FIG. 2. Thus, the lid is self-opening. By that it is meant that the lid is arranged to automatically pivot from a closed position, like shown in FIG. 1, to an open position, like shown in FIG. 2, by the spring 32 when a catch 28 is released.

Figure 4B:
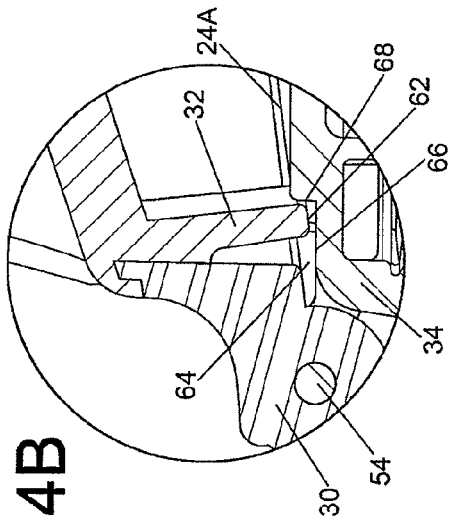

The hinge 30 is best seen in FIGS. 1, 2 and 4B and basically comprises a pair of ears 52 forming a yoke, a pivot pin 54 and a central member 56. The pair of ears project outward from the outer surface of the cap member diametrically opposite the location of the catch 28. The central member is fixedly secured to the lid 24 and is located between the ears 52 of the yoke, with the pivot pin 54 extending through aligned openings in the ears and the central member. A pair of detents 58 is located on the central member.

Turning now to FIGS. 4B, 4D, 4F, 4H and 4J, the details of the spring element or member 32 will now be described. Basically that member comprises a projection or finger formed of an elastomeric material, e.g., TPE. As mentioned above, in the exemplary embodiment shown the spring element 32 is preferably integrally over-molded with the portion of the lid forming the diaphragm 42 and the portions 40 and 44. The spring element 32 extends downward from the undersurface 60 of the portion of the lid adjacent the hinge 30 and has a free end 62 which is arranged to cooperate with a containment area of the cap member to cause the opening of the lid. The containment area is in the form of a recess 64 in the top surface of the cap adjacent the hinge. The recess 64 includes a bottom contact surface 66 and a front contact surface 68 which projects upward from the bottom contact surface.

Figure 4C:
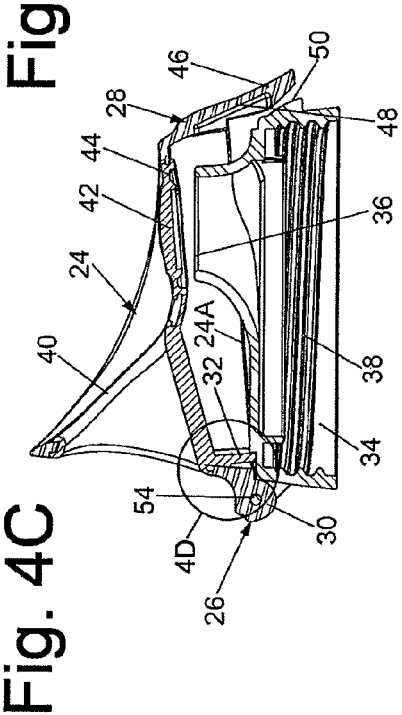
Figure 4D:
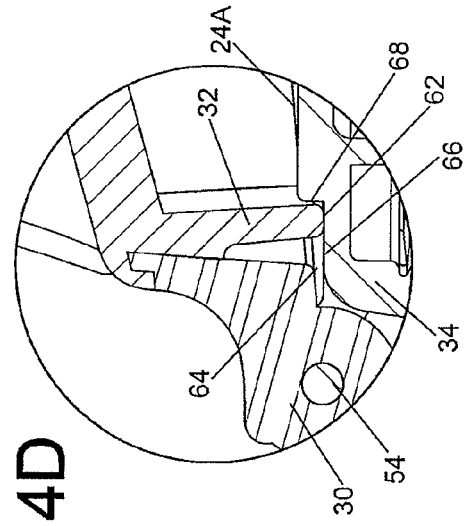
Figure 4J:
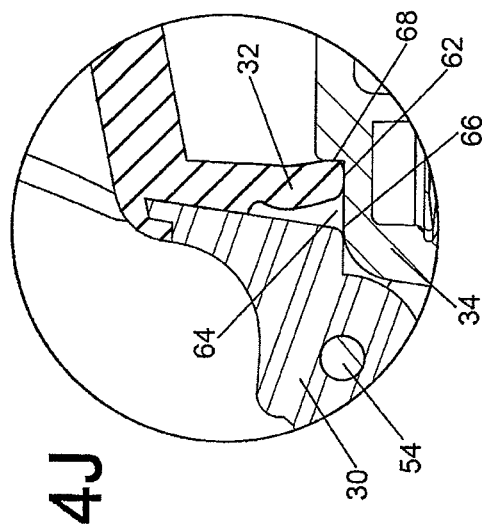
Figure 4I:
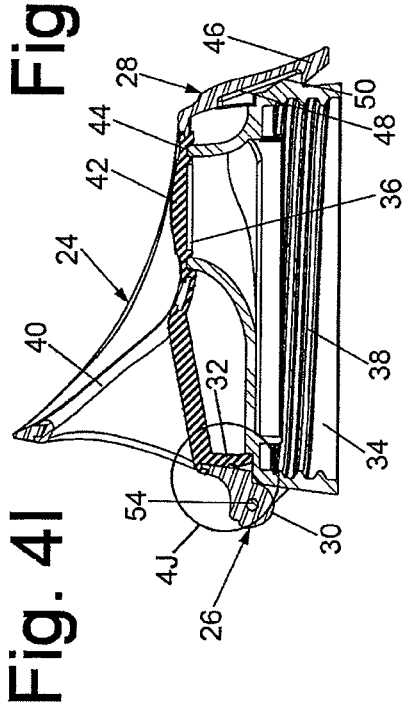

The spring member 32 projects downward from the undersurface of the lid adjacent the location of the hinge 30 and is arranged to cooperate with the geometry of the containment area recess 64 to produce a variable spring rate. This action is achieved by the fact that the spring member operates bi-modally. For example, the sequence of FIGS. 4A/4B to 4G/4H shows the lid 24 of the bottle 20 as it is being closed. In particular, FIGS. 4A and 4B show the lid at the stage at which the elastomeric spring element 32 is in what can be referred to as a reed or leaf spring state, where its free end 62 is about to make contact with the containment area (recess) 64 in the cap 34. FIGS. 4C and 4D show the lid at the stage at which the elastomeric spring element, still in its reed spring state, initially makes contact with the bottom contact surface 66 of the recess. FIGS. 4E and 4F show the lid at the stage at which the elastomeric spring element is still behaving as a reed spring and begins to bend and slide along the bottom contact surface 66 of the recess towards the front contact surface 68. FIGS. 4G and 4H show the lid at the stage at which the elastomeric spring element begins transitioning to a compression state by its free end 62 engaging the intersection of the bottom contact surface 66 and the front contact surface 68 of the recess, thereby increasing the spring rate. Lastly, FIGS. 4I and 4J show the lid at the stage where it is fully closed and the spring is in its maximum compression and flexed state, whereupon the spring rate is the highest. The flexing and compression of the spring as it is brought into this state by the closure of the lid will store energy within the spring. It is this energy which, when the latch 28 is released, causes the lid 24 to automatically spring open against the force of gravity.

During opening of the lid, the spring element 32 operates in a reverse manner, i.e., it acts as a compression and reed spring during the initial phase of the opening of the lid and then transitions into solely a reed spring during a later phase of its operation to thereby bring the lid to its open position without any abrupt or jarring action. In particular, as seen in FIGS. 4I and 4J when the lid is closed and latched the free end 62 of the elastomeric spring element 32 is trapped between the front contact surface 68 and the bottom contact surface 66 in the recess 64 of the cap, so that the spring element 32 operates as a compression spring with a higher spring rate. This action enables the effective raising the lid when its full weight is on as the catch is released. As the lid 24 pivots upward (raises) as shown in the sequence of FIGS. 4F, 4D and 4B its center of gravity moves closer to the fulcrum (i.e., pivot pin 54 of the hinge 30), thereby reducing the force required to continue lifting the lid. The spring element 32 continues to act at approximately the same distance from the fulcrum. Once the free end 62 of the spring element is no longer in engagement with either of the contact surfaces 66 or 68, the spring element becomes solely a reed spring and the momentum of the movement of the lid carries the lid through its upward stroke in a controlled, non jarring manner until it is open. At this point the pair of detents 58 that is located on the hinge holds the lid in its open position.

As will be appreciated from the foregoing the spring of this invention provides variable rate action that exhibits a high force at maximum compression, but one that drops with displacement, thereby providing the proper force to complete the opening motion of the lid with good and non-abrupt tactile feel. By so doing the spring assembly of this invention overcomes many of the problems of prior art springs. For example, the use of a constant rate spring to pivotably open a lid requires overcoming two inherent problems, namely, too low a spring rate will not store enough energy to open the lid, and too high a spring rate will abruptly snap the lid open. Moreover, if the constant spring rate is high enough to assure opening, the momentum of the lid when it reaches its end stop will likely result in a jarring action. Thus, with constant rate springs one has to balance the force produced so that it is not too high or too low. This results in an extremely narrow range in a constant rate spring. If the product incorporating the self-opening, spring-biased lid is a low cost one, such as a drinking bottle, manufacturing tolerances make it extremely difficult (if not impossible) to maintain a balance in that range. While there are conventional variable rate springs that could be used in lieu of the subject invention to exhibit a high force at maximum compression, but with the force dropping with the lid's displacement to thereby provide the proper force to complete the opening motion (as does the spring assembly of this invention), such conventional variable rate springs require complex geometry that is expensive to make and to accurately control.

In contradistinction, the spring assembly of this invention, like conventional variable rate springs, produces a variable spring rate, but unlike such prior art devices, does so with a simple construction. In particular, it makes use of an elastomeric spring element that in cooperation with a containment area operates bi-modally, i.e., as a compression spring and as a reed spring. It should be pointed out at this juncture that the use of the term reed spring is not meant to be limiting. Thus, it encompasses springs which are referred to as leaf springs, whether single or multiple leaf/leaves, or beam springs. The spring assembly of this invention compensates for manufacturing tolerances, produces high energy storage in a short distance, makes use of a reed that is curved slightly to follow the lid's shape and allows it to be wider to increase its spring rate, is integral with the upper surface to retain the spring in position and eliminates assembly.

Without further elaboration the foregoing will so fully illustrate our invention that others may, by applying current or future knowledge, adopt the same for use under various conditions of service.

It is claimed:

1. A portable container for holding a liquid therein, said container comprising:
   a) a hollow vessel including an interior compartment for retaining the liquid:
   b) a cap member removably coupled to the hollow vessel and including a passage therein for communicating with the interior compartment, said cap member having an outer periphery;
   c) a lid, having an upper wall pivotally connected to said cap member by a hinge and movable between a fully closed state and an opened state, and vice versa, to selectively close off or open the passage in said cap member; and
   d) a spring assembly configured to automatically cause said lid to be pivoted from a fully closed state to an opened state upon the release of a catch, said spring assembly comprising an elongate elastomeric spring member and a containment area recess, said recess forming a portion of said cap member and being open at said periphery of said cap member, said recess having a contact surface, said elongate elastomeric spring member and a portion of said upper wall being an integrally molded as unit, said elongate elastomeric spring member having an initial shape including a distal free end terminating in a distal surface, said distal surface of said elongate elastomeric spring member engaging said contact surface when said lid is in the fully closed state and being configured to operate bi-modally wherein said elongate elastomeric spring member operates as a reed and compression spring when said lid is in the fully closed state and operates as a reed spring after said lid has begun opening to carry said lid to its opened state.

2. The portable container of claim 1 whereupon when said lid is in the fully closed state said elastomeric member pushes against said contact surface to cause said elongate elastomeric spring member to flex from said initial shape and be in compression to store energy therein.

3. The portable container of claim 2 wherein said spring assembly is arranged when the catch is released to enable the energy stored in said elongate spring elastomeric member to be released, whereupon said elongate elastomeric spring member pushes off of said contact surface to automatically cause said lid to pivot from its fully closed state toward its opened state, with said elongate elastomeric spring member transitioning from said flexed and compressed state to an unflexed state when said lid is in the opened state.

4. The portable container of claim 1 wherein said member at which said containment area recess is located comprises a cap for the vessel.

5. The portable container of claim 4 wherein said containment area recess is located adjacent said hinge.

6. A portable container for holding a liquid therein, said container comprising:

a) a hollow vessel including an interior compartment for retaining the liquid;
   b) a cap member removably coupled to the hollow vessel and including a passage therein for communicating with the interior compartment;
   c) a lid coupled to said spring assembly and pivotally connected to said member by a hinge, said lid being movable between a fully closed state and an opened state, and vice versa, to selectively close off or open the passage in said cap member; and
   d) a spring assembly configured to automatically cause said lid to be pivoted from a fully closed state to an opened state upon the release of a catch, said spring assembly comprising an elongate elastomeric member and a containment area recess having a contact surface, said contact surface comprising a bottom contact surface of said containment area recess, said containment area recess additionally comprising a front contact surface extending generally normal to said bottom contact surface at a forward end of said bottom contact surface, said containment area recess being open and unobstructed at a rear end of said bottom contact surface, said elongate elastomeric member being integrally formed as part of said lid and having an initial shape including a distal free end terminating in a distal surface, said member removably coupled to said vessel including said containment area recess, said distal surface of said elongate elastomeric member engaging said contact surface when said lid is in the fully closed state and being configured to operate bi-modally wherein said elongate elastomeric member operates as a reed and compression spring when said lid is in the fully closed state and operates as a reed spring after said lid has begun opening to carry said lid to its opened state.

7. The portable container of claim 6 wherein said distal surface of said elongate elastomeric member engages said bottom contact surface when said lid is in the fully closed state and is spaced from said bottom contact surface when said lid is in the opened state.

8. The portable container of claim 6 wherein said distal surface of said free end of said elongate elastomeric member pushes against said bottom contact surface and another surface of said elongate elastomeric member adjacent said distal surface pushes against said front contact surface to cause said elongate elastomeric member to bend slightly and be in compression to store energy therein when said lid is in the fully closed state and operates as a reed spring with said elongate elastomeric member reassuming its initial shape after said lid has begun opening to carry said lid to the opened state.

9. The portable container of claim 8 wherein when contact is made by said distal surface with said bottom contact surface as said lid is being moved into a closed position said distal surface slides along said bottom contact surface until said front contact surface is contacted by and pushes against the another surface of said elongate elastomeric member as said lid is moved into its fully closed state.

10. The portable container of claim 1 wherein said initial shape of said elongated elastomeric member is linear.

11. A spring assembly for use in a product having a hollow body and a lid pivotably connected to the body by a hinge to selectively close off or expose the interior of the body, said spring assembly being configured to automatically cause the lid to be pivoted from a fully closed state to an opened state upon the release of a catch, said spring assembly comprising:

a) an elongate elastomeric member; and
b) a containment area recess having a contact surface, said contact surface comprising a bottom contact surface of said containment area recess, said containment area recess additionally comprising a front contact surface extending generally normal to said bottom contact surface at a forward end of said bottom contact surface, said containment area recess being open and unobstructed at a rear end of said bottom contact surface, said elongate elastomeric member having an initial shape including a distal free end terminating in a distal surface, said distal surface of said elongate elastomeric member engaging said contact surface when said lid is in the fully closed state and being configured to operate bi-modally wherein said elongate elastomeric member operates as a reed and compression spring when said lid is in the fully closed state and operates as a reed spring after said lid has begun opening to carry said lid to its opened state.

12. The spring assembly of claim 11 whereupon when the lid is in the fully closed state said elastomeric member pushes against said contact surface to cause said elastomeric member to flex and be in compression to store energy therein.

13. The spring assembly of claim 12 wherein said spring assembly is arranged when the catch is released to enable the energy stored in said elongate elastomeric member to be released, whereupon said elongate elastomeric member pushes off of said contact surface to automatically cause said lid to pivot from its fully closed state toward its opened state, with said elongate elastomeric member transitioning from said flexed and compressed state to an unflexed state when said lid is in the opened state.

14. The spring assembly of claim 11 wherein said distal surface of said elongate elastomeric member engages said bottom contact surface when said lid is in the fully closed state and is spaced from said bottom contact surface when said lid is in the opened state.

15. The spring assembly of claim 11 wherein said distal surface of said free end of said elongate elastomeric member pushes against said bottom contact surface and another surface of said elongate elastomeric member adjacent said distal surface pushes against said front contact surface to cause said elastomeric member to bend slightly and be in compression to store energy therein when said lid is in the fully closed state and operates as a reed spring with said elongate elastomeric member reassuming its initial shape after said lid has begun opening to carry said lid to the opened state.

16. The spring assembly of claim 15 wherein when contact is made by said distal surface with said bottom contact surface as said lid is being moved into a closed position said distal surface slides along said bottom contact surface until said front contact surface is contacted by and pushes against the another surface of said elongate elastomeric member as said lid is moved into its fully closed state.

17. The spring assembly of claim 11 wherein said initial shape of said elongated elastomeric member is linear.

18. The spring assembly of claim 17 wherein said elongated elastomeric member comprises a thermoplastic elastomer (TPE) or another copolymers or a physical mix of polymers having both thermoplastic and elastomeric properties.

19. The spring assembly of claim 15 wherein the product comprises a hollow vessel and a cap for the vessel and wherein said containment area recess is located in the cap.

* * * * *